United States Patent Office 3,030,375
Patented Apr. 17, 1962

3,030,375
NOVEL BORATED COMPOUNDS
Richard J. De Gray, Shaker Heights, and Sarah H. Belden, Cleveland, Ohio, assignors to The Standard Oil Company, Cleveland, Ohio, a corporation of Ohio
No Drawing. Original application Feb. 25, 1959, Ser. No. 795,349, now Patent No. 2,965,459, dated Dec. 20, 1960. Divided and this application Dec. 30, 1959, Ser. No. 3,225
4 Claims. (Cl. 260—307)

This application is a division of our application Serial No. 795,349, filed February 25, 1959, now Patent No. 2,965,459.

This invention relates to novel compounds comprising borated oxazolines, the process for preparing these compounds. In particular, this invention relates to a class of novel boron compounds for use in gasoline which are prepared by reacting boric acid or boric oxide with a substituted oxazoline compound having the following general formula:

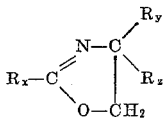

wherein $R_x$ represents a saturated or unsaturated hydrocarbon, preferably an aliphatic hydrocarbon radical, containing 7 to 19 carbon atoms, and where $R_y$ represents the radical $-(CH_2)_nOH$ where $n$ is a small whole number such as 1 to 3, and where $R_z$ represents a radical selected from the group consisting of $R_y$, hydrogen, or a lower alkyl radical having 1 to 3 carbon atoms.

When $R_z$ is $R_y$, the compounds will have the formula:

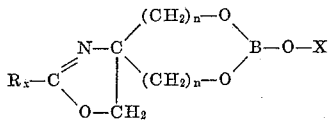

where X is hydrogen or

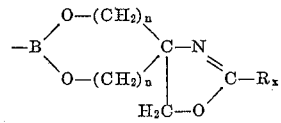

When $R_z$ is hydrogen or an alkyl radical, the compounds have the formula:

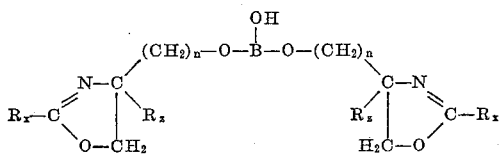

The above boron compounds of this invention may be incorporated in a gasoline in amounts between 0.0025 to 0.05% by weight, with amounts from 0.02 to 0.05% by weight being preferred.

The substituted oxazoline compound used in preparing the boron compounds of this invention may be prepared from amino hydroxy compounds through their fatty amides, or any other known procedure. In preparing these oxazolines from the fatty acid amides, a suitable amino hydroxy compound is reacted with a desirable fatty acid, or a mixture thereof, at an elevated temperature to yield the amide. The temperature is then increased so as to split out water and form the oxazoline.

Any of the compounds having the general formula offered above are suitable for the invention. The preferred compounds, however, are those in which $R_x$ as defined heretofore contains 11 to 17 carbon atoms for maximum solubility in hydrocarbon fuel and where $R_z$ is the equivalent of $R_y$. Mixtures of compounds may be used as $R_x$, and this frequently will be the case since the $R_x$ radical is derived from naturally occurring fats and oils, and hence $R_x$ will correspond to the fatty acid radicals in such fats and oils, such as tallow, cottonseed oil, soybean oil, tall oil, etc. The nature of $R_x$ does not affect the results appreciably, it has been found, and therefore its selection will be dictated largely by economics. The commercial grade of the compounds, including small amounts of impurities or by-products, are suitable. A particularly desirable compound for purposes of the invention is 2-hepta decenyl 4,4-bis-(hydroxy methyl) oxazoline and has the formula:

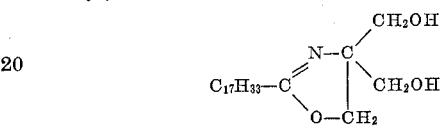

These substituted oxazolines readily undergo reaction with boric acid under conditions in which the water of reaction may be removed from the reaction mixture as it is formed. This removal of water may be accomplished by simple boiling, but it is preferable to remove the water by means of azeotropic fractional distillation. Boric oxide may be used in place of boric acid in these reactions with only the requirement for making the appropriate weight adjustment in order to maintain the molar relationship with the substituted oxazoline.

The preparation of these compounds will be better understood in connection with the following example in which the substituted oxazoline is 2-heptadecenyl 4,4-bis-(hydroxy methyl) oxazoline but which is typical of the reaction with other substituted oxazolines of the general formula previously designated. The parts referred to in the examples are parts by weight unless otherwise noted.

*Example 1*

100 parts of 2-heptadecenyl 4,4-bis-(hydroxy methyl) oxazoline was dissolved in 200 parts of benzene. 16.8 parts of boric acid was then added (a 1:1 molar ratio) and the mixture refluxed at the azeotropic distillation temperature for the removal of water with the benzene overhead from the reaction mixture. The remainder of the benzene was distilled off. The reaction proceeds readily in accordance with the following equation:

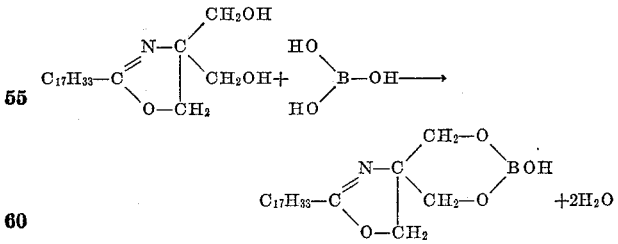

The reaction product was a clear liquid upon cooling and was soluble in gasoline.

*Example 2*

50 parts of 2-heptadecenyl 4,4-bis-(hydroxy methyl) oxazoline was dissolved in 100 parts of benzene. 8.4 parts of dry boric acid was then added (a 1:1 molar ratio) and the mixture refluxed for several hours at the azeotropic distillation temperature for the removal of water overhead. The reaction proceeds in accordance with the following equation:

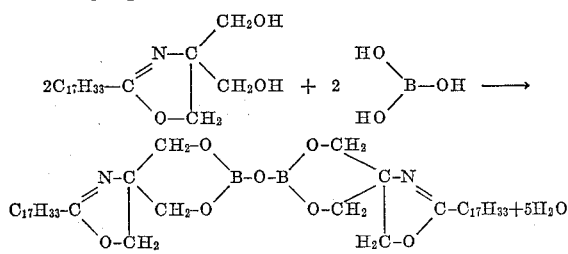

The remainder of the benzene was distilled off and the compound of this example, upon cooling to room temperature, was a clear liquid and soluble in gasoline. The recovery of the water of reaction showed that two and one-half mols of water were formed for each mol of 2-heptadecenyl 4,4-bis-(hydroxy methyl) oxazoline and boric acid reacting.

The compound of this example can also be prepared from the compound of Example 1 by further dehydration of the latter according to the equation:

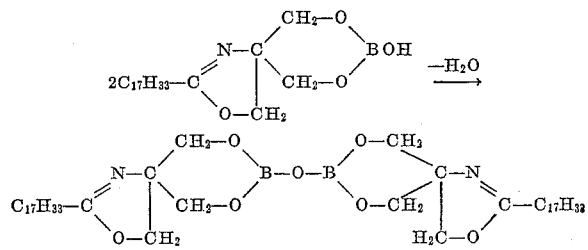

*Example 3*

100 parts of 2-heptadecenyl 4-methyl, 4-hydroxy methyl oxazoline was disolved in 200 parts of benzene. 8.8 parts of boric acid was then added (a 2:1 molar ratio) and the mixture was refluxed at the azeotropic distillation temperature for the removal of water with benzene overhead. The remainder of the benzene was distilled off. The reaction proceeds according to the following equation:

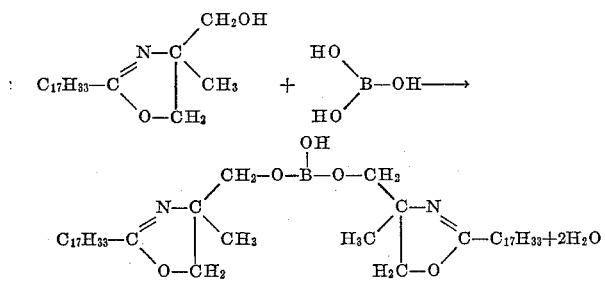

The reaction product was a clear liquid at room temperature and was soluble in gasoline.

As stated heretofore, the boron compounds of this invention are stable toward hydrolysis and particularly so when dissolved in gasoline. It has been found that small amounts of these compounds may be added to gasoline as a means of improving the hydrolytic stability of other organo boron compounds which, when present in gasoline alone, have limited commercial value due to their tendency to hydrolyze in the presence of moisture. In this manner, it is possible to introduce a desired amount of elemental boron into a gasoline by utilizing a major amount of an organo boron compound offering a high elemental boron content but otherwise undesirable due to its hydrolytic stability in conjunction with minor amounts of one or more of the boron compounds of the present invention, thereby lowering the total amount of additive required in the fuel and insuring adequate hydrolytic stability. It has been found that the addition of as little as 5 to 10% of the boron additive as a compound of the class set forth hereinbefore can significantly improve the hydrolytic stability of various organo boron compounds. This scheme of introducing adequate elemental boron to the combustion chamber to offset the adverse effects of combustion chamber deposits is particularly fortuitous since, as will be obvious from the above reported results, only very small amounts of the boron compounds of this invention are required to provide significant improvements in engine operation with respect to carburetor cleaning and carburetor anti-icing.

We claim:

1. A boron-containing oxazoline compound selected from the group consisting of (1)

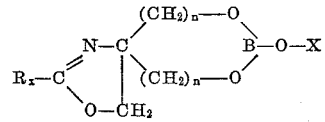

where X is selected from the group consisting of hydrogen and

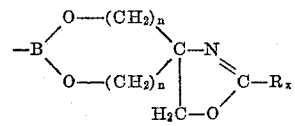

and (2)

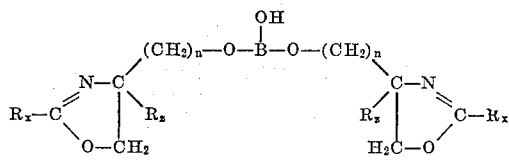

wherein $R_x$ is a member selected from the group consisting of alkyl and alkenyl both of 7–19 carbon atoms and mixtures of these as derived from naturally occurring fats and oils, where $n$ is a small whole number from 1 to 3 and where $R_z$ is a member selected from the group consisting of hydrogen and lower alkyl of 1 to 3 carbon atoms.

2. A new compound having the formula:

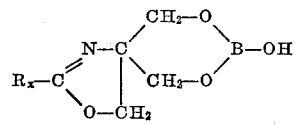

wherein $R_x$ is a monovalent aliphatic hydrocarbon containing 7 to 19 carbon atoms free of acetylenic linkage.

3. A new compound having the formula:

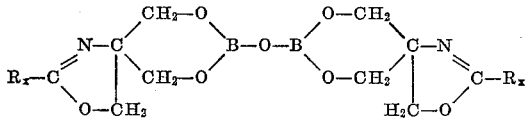

wherein $R_x$ is a monovalent aliphatic hydrocarbon containing 7 to 19 carbon atoms free of acetylenic linkage.

4. A new compound having the formula:

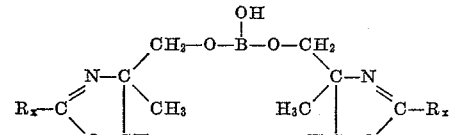

wherein $R_x$ is a monovalent aliphatic hydrocarbon containing 7 to 19 carbon atoms free of acetylenic linkage.

No references cited.